Sept. 29, 1936.  C. H. ROTH  2,056,144
LIGHT VALVE FOR PLATE OR FILM HOLDERS
Filed May 20, 1936
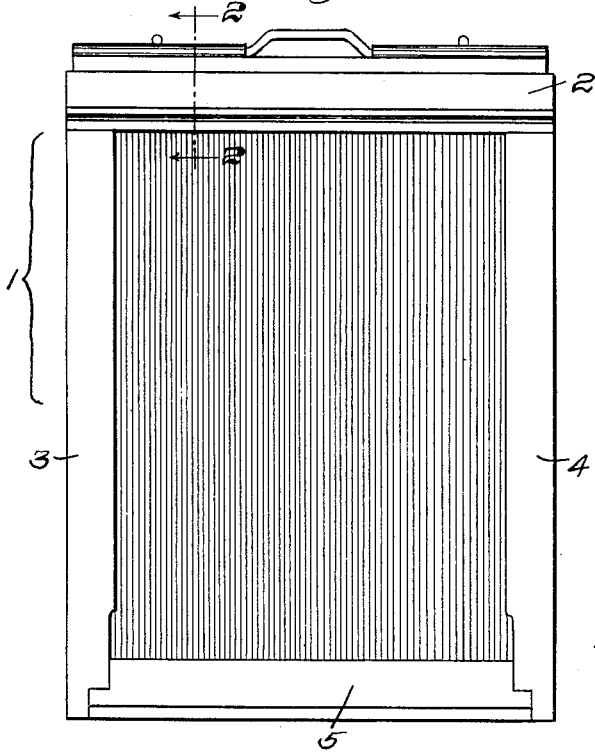
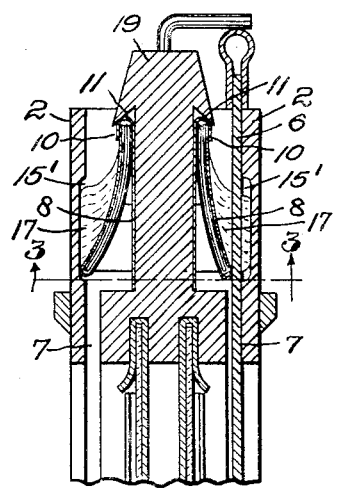
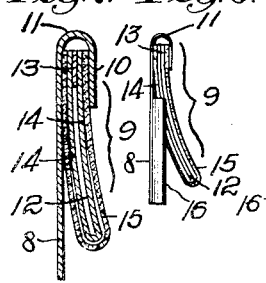
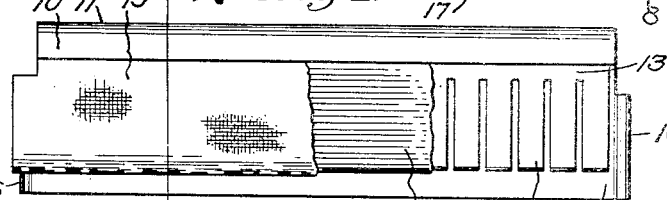
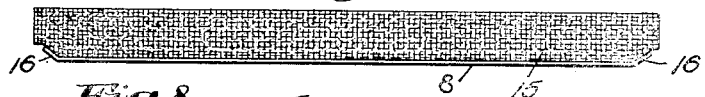
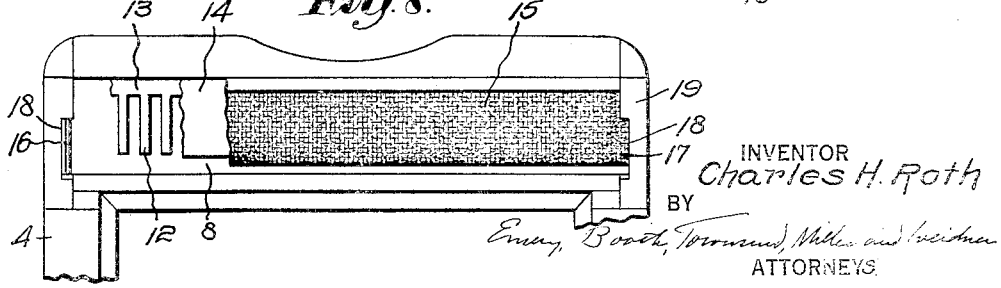
INVENTOR
Charles H. Roth
BY
ATTORNEYS Patented Sept. 29, 1936

2,056,144

UNITED STATES PATENT OFFICE 2,056,144

LIGHT VALVE FOR PLATE OR FILM HOLDERS

Charles H. Roth, Rush, N. Y., assignor to The Folmer Graflex Corporation, Rochester, N. Y., a corporation of Delaware Application May 20, 1936, Serial No. 80,752

6 Claims. (Cl. 95—67)

This invention relates to photography, and more particularly to plate or film holders in which sheets of photographically sensitive material, while upon suitable supports, may be exposed in a camera.

In order that the principle of the invention may be readily understood, I have disclosed a single embodiment thereof in the accompanying drawing, wherein—

Fig. 1 is a plan view of a plate or film holder having my invention embodied therein;

Fig. 2 is a detail upon an enlarged scale in vertical cross section upon the line 2—2 of Fig. 1, and looking toward the left in that figure;

Fig. 3 is a horizontal cross section upon the line 3—3 of Fig. 2 and looking upward in that figure;

Figure 4 is a plan view with parts broken away of the light valve for the holder and containing my invention;

Fig. 5 is an elevation of the structure shown in Fig. 4 and looking upward from the bottom of that figure;

Fig. 6 is an end elevation of the structure shown in Fig. 4;

Fig. 7 is a vertical section on the line 7—7 of Fig. 4, upon a slightly enlarged scale; and Fig. 8 is a plan view with parts broken away of the light valve as applied to the end of a plate or film holder.

Holders for sensitized sheets have long been provided with light guards but so far as I am aware they have not proved satisfactory under all conditions of operation and particularly with plates or films of great sensitiveness. In the patent to William F. Folmer, No. 1,631,479, June 7, 1927, is disclosed a film holder having a light guard upon which my invention is a distinct improvement, inasmuch as by my invention I am enabled entirely to prevent the penetration of light at the ends of the light guard, whether of the construction there shown or of other construction, or, in other words, at either of the upper corners of the holder. It is the purpose of my invention to provide a holder which is light tight whether the dark slide be withdrawn wholly or only in part or is fully in position, and which will withstand changes in temperature and other changes in atmospheric conditions, so as to prevent entirely the entrance of light at any point under all conditions.

While the holder itself may be of any suitable character or construction, I have represented a holder of the same general character as that shown in the said Folmer patent, and I have represented a light-excluding member of the same general character as that shown in detail in said patent but with such changes as to render the light-excluding member or light-valve entirely effective to prevent the admission of light even at the corners of the upper end of the holder. My invention is, however, not limited to a light-excluding member of the general character shown in that patent.

Referring more particularly to the drawing, I have therein represented a holder 1 that is provided with a cross bar or light-valve cover 2 at the top thereof, sides 3 and 4, and a bottom 5. While the invention may be applied to a holder receiving either one or two sensitized surfaces, I have herein represented a double holder. One of the dark slides of the holder is represented in position at 6 in Figs. 2 and 3, and the other holder is adapted to be inserted in the groove 7 at the opposite side of the holder. While any suitable material may be provided, I preferably form the holder from selected close grained cherry wood chosen because of its ability to stand light and changes in temperature or other atmospheric conditions. The dark slides may be of any suitable material, being carefully tested to prove the absence of phenol or other fogging compound, and at the same time to establish absolute assurance against penetration of infra red rays through the material.

Extreme care is necessary in providing a suitable cut-off or light-valve inasmuch as if merely a corner of the dark slide is inserted in the act of placing the dark slide in the holder, the entire slot for such slide is opened up, thus exposing a very substantial portion of the sensitized surface to light leak or fog. It was sought by the structure shown in the said Folmer Patent No. 1,631,479 to overcome this and other difficulties but without providing a structure that would in reality insure against the penetration of light at the extreme corners at the upper end of the holder,—that is to say, at the opposite ends of the slots for the dark slides.

In that embodiment of my invention herein shown, but to which my invention is not limited, I have indicated a holder which is made in part at least of wood; it is clearly to be understood, however, that my invention is not limited to the use of any particular material. It is unnecessary to describe the illustrated holder in detail since aside from the parts to which my invention more particularly applies, it may be and preferably is of the general character shown in said patent to Folmer, No. 1,631,479, to which reference is made for complete disclosure.

The light-valve cover 2 may be and desirably is of substantially the same general structure as the corresponding part in said patent. Referring more particularly to the light-valve itself, the same, between the edges of each dark slide, may be generally of the same character as that illustrated in detail in Fig. 3 of the said patent to Folmer, No. 1,631,479, but my invention is not, however, limited thereto, since other types of light-valves or light breaks may be provided, but which must be changed or supplemented so as to present or embody my invention. For convenience of reference and without limiting myself thereto I will refer specifically to the light-valve shown in the said patent.

I will now describe the light-valve or, as it is sometimes called, the light-shutter. The metallic plate 8, shown most clearly in Figs. 4 and 8, has a formed or turned upper section, as clearly shown at 11 in Fig. 7. It also has the ends bent up at marked or substantial angles, as shown at 16 in Figs. 3, 5, and 6. A metallic comb-like structure 12 (Figs. 4 and 8) is covered by a strong flexible material such as paper, shown at 14 in Figs. 4 and 8, and this in turn is covered with a soft cloth material such as broadcloth or felt 15, as shown in Figs. 4 to 8. These three elements 12, 14, 15 are clamped in the metal part 8, as is clearly shown in Figs. 6 and 7. In the manufacture of the part 12, a permanent curl is imparted to the metal. This serves as a series of small springs, which are used to cause contact of the light-excluding member, both against the face of and around the edges of the dark slide 6, Figs. 2 and 3, and when the slide 6 is removed, the contact is made between the light-excluding member and shutter cover 2, Figs. 2 and 3. This contact takes place in a depressed or cut-out portion of the shutter cover, clearly shown at 15' in Fig. 2, thus excluding any light when the slide is withdrawn. In Fig. 3, which, as stated, is a cross section of Fig. 2 on line 3—3, is clearly illustrated the manner in which the light-valve fabric or other element is caused to contact with the dark slide 6 and to wrap itself more or less around the edges of the dark slide 6. This condition is brought about by the bent-up end portions 16 of part 8 shown in Figs. 3, 4, 5, 6, and 8.

It is very important that light be excluded from around the edges of the dark slide when in position, or at such points when the slide is removed, because of the development of the newer and much more sensitive materials that are available today. A small amount of leakage has taken place heretofore, but because of the slower sensitized materials caused no serious trouble. However, with the new highly sensitive photographic emulsions used today, no trace of light must be allowed to reach the sensitized surface before or after exposure.

Again referring to Fig. 3, it is clearly indicated that when slide 6 is removed from the holder, the light valve is caused to rest against shutter cover 2 and thus becomes seated in the depressed or cut-out portion 15', as shown in Fig. 2, thereby excluding all light from traveling through the slot that was previously occupied by slide 6.

Fig. 8 represents a plate holder with shutter cover 2 removed and shows the light valve in position. The cut-out or recessed portion 18 in holder member 19 is clearly shown, and the light-valve or shutter is shown extending over into this cut-out or recessed portion. This construction is of great importance as it allows the bent-up portions 16 of the metallic plate 8 to extend around the edges of the dark slide 6, thus excluding all light that might enter in between the edge of the dark slide 6 and the holder. While the ends 16 are shown as bent up at about a forty five degree angle, my invention is not limited to such construction, though I have found the same to be most effective.

Such construction is markedly different from and is much more effective than the small plush or other piece indicated at 35 in Fig. 4 of the said Folmer patent.

Having thus described one illustrative embodiment of the invention, it is to be understood that although specific terms are employed, they are used in a generic and descriptive sense and not for purposes of limitation, the scope of the invention being set forth in the following claims.

I claim:

1. A film or plate holder having one or more dark slides adapted to be withdrawn from an end of the holder, the latter having a slot-like formation for receiving each slide, said holder also having means to prevent any entrance of light at the portions of said holder where the lateral edges of the slide or slides are adapted to be received, said means including light-excluding fabric-like material at the slide-withdrawal corners of the lateral edges of each slide, and backing means for said material compelling said fabric-like material to be deflected toward the face of such slide opposite to that face against which lies the main portion of said fabric-like material.

2. A film or plate holder having one or more dark slides adapted to be withdrawn from an end of the holder, the latter having a slot-like formation for receiving each slide, said holder having light-valve means to prevent any entrance of light at the slide-withdrawing end thereof, both where the lateral edges of the slide or slides are adapted to be received and therebetween, said means including light-excluding fabric-like material extending from lateral edge to lateral edge of a dark slide, and backing means for said material compelling said material to be deflected at its ends toward a face of such slide opposite to that face against which lies the main portion of said fabric-like material.

3. A film or plate holder having one or more dark slides adapted to be withdrawn from an end of the holder, the latter having a slot-like formation for receiving each slide, said holder having a light-excluding member extending from edge to edge of a dark slide thereof when in position in the holder and also extending sufficiently about both lateral edges of said slide to exclude the entrance of light at such points, and a backing plate for said member having ends deflected toward the face of the slide opposite to that face against which the body portion of the member lies when the slide is in position.

4. A film or plate holder having one or more dark slides adapted to be withdrawn from an end of the holder, the latter having a slot-like formation for receiving each slide, said holder having a light-excluding fabric-like member lying in a plane from edge to edge of a slide when in position, said member being bent or deflected at its ends out of the plane of the body portion thereof toward the face of the slide opposite to that against which the body portion of said member lies when the slide is in position.

5. A film or plate holder having one or more dark slides adapted to be withdrawn from an end of the holder, the latter having a slot-like formation for receiving each slide, said holder at the slide-withdrawing end of the holder having a metal plate extending transversely of the holder from lateral edge to lateral edge of a slide when in position, the ends of said metal plate being deflected toward the face of the slide when the latter is in position, and a light-excluding fabric-like member superimposed upon said metal plate and adapted to be positioned by said deflected ends of the plate substantially about the said lateral edges of the slide when the latter is in position.

6. A film or plate holder having one or more dark slides adapted to be withdrawn from an end of the holder, the latter having a slot-like formation for receiving each slide, said holder at the slide-withdrawing end thereof having a spring metal plate extending transversely of the holder and at its ends extending beyond the lateral edges of the corresponding dark slide when the latter is in position, and a light-excluding strip superimposed upon a face of said plate and positioned by the ends of the said plate substantially about each lateral edge of such slide, so as to exclude entirely the entrance of light thereat.

CHARLES H. ROTH.